Feb. 14, 1939. J. H. RAM 2,147,351
REEL HOLDER
Filed July 1, 1936
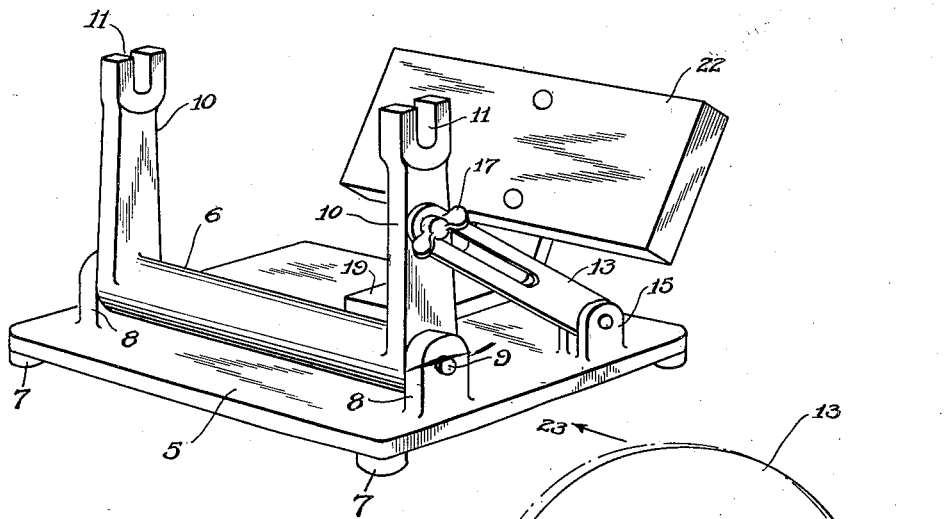
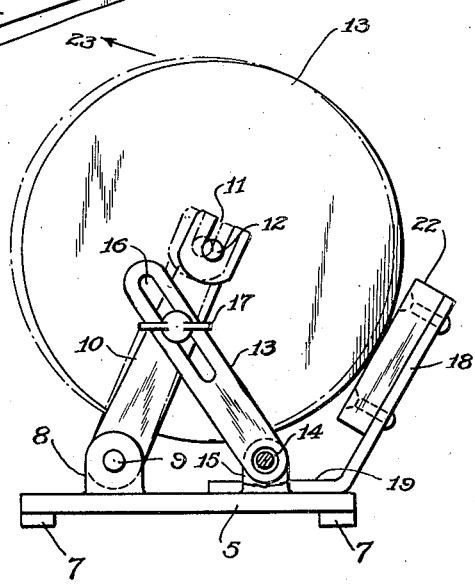
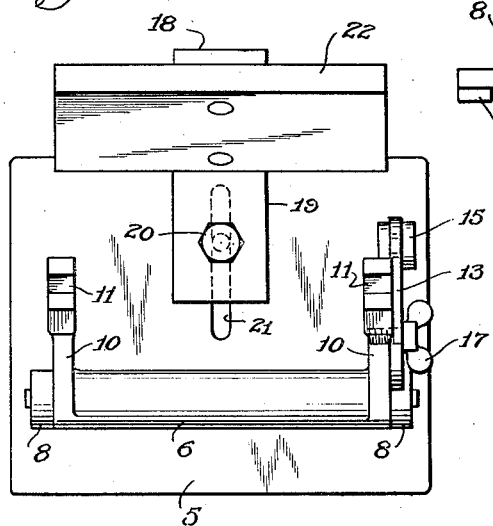
John H. Ram
INVENTOR
BY Victor J. Evans & Co.
ATTORNEYS Patented Feb. 14, 1939

2,147,351

UNITED STATES PATENT OFFICE 2,147,351

REEL HOLDER

John H. Ram, Jersey City, N. J.

Application July 1, 1936, Serial No. 88,470

3 Claims. (Cl. 242—156)

The present invention relates to a new and improved reel holder and more particularly to the provision of a brake to prevent the reel from overrunning.

The primary object of the invention is to provide a reel holder that is simple in construction and design, which allows for rapid exchange of reels and includes a braking feature adapted to prevent overrunning of the reel by reducing the rotary momentum thereof.

The invention will be fully and comprehensively understood from a consideration of the following detailed description when read in connection with the accompanying drawing which forms part of the application.

In the drawing:

Fig. 1 is a perspective view of the device.

Fig. 2 is an end elevational view of the device and illustrating a reel supported therein, with supporting arms in different position from that illustrated in Fig. 1; and Fig. 3 is a top plan view of the device shown in Fig. 1.

Referring to the drawing for a more detailed description thereof, the numeral 5 indicates the supporting base to which the adjustable reel holding means 6 is attached. The base 5 may be provided with supporting anti-friction members or the like 7 for rendering the device slidable over a surface.

The adjustable reel holding means 6 is pivotally supported in the brackets 8, the ends 9 being journalled in said bracket and movable therein. Extending upwardly from the base 5 are a pair of arms 10, the ends 11 thereof being U-shaped to receive the shaft 12 of the reel or spool 13.

The supporting arms 10 are adjustably held by means of the stop 13 which has one end loosely journalled at 14 in brackets 15. The upper end of the stop 13 is slotted as at 16 for slidably receiving a fastening element such as the wing bolt 17, the control of which limits the movement of the arms 10.

The brake member 18 is adjustably supported in the base 5 by means of the extension 19 which is clamped to the base by a nut 20 movable in the slot 21. It is preferred that the brake 18 be adjustably supported, thereby adapting the reel holder for use with various sized reels or spools. A friction material 22 is the braking medium which contacts the spool or reel 13 to prevent its overrunning.

The hereinabove described device is applicable for unreeling any material from the smallest wire to a large cable or any other material that is wound on spools or reels. In the operation thereof, a pull at the arrow 23 draws the spool or reel 13 away from the brake 22, as illustrated in dot and dash lines in Fig. 2 of the drawing. In the pivotal point 14 of the stop 13, the pivot pin is smaller in diameter than the opening to limit the clearance of the brake. A continued pull on the material wound on the spool or reel 13 maintains the same away from the brake 22. However, diminishing the speed of withdrawal causes the reel 13 to assume its normal position, thereby increasing the pressure of the brake 22. This arrangement establishes a floating balance which will govern the brake pressure and thereby prevent the spool 13 from overrunning. The decrease of tension, due to loss of weight, is compensated by diminishing radius at which the wire leaves the spool.

It is to be understood that this improvement is capable of extended application and is not confined to the exact showing of the drawing nor to the precise construction described and, therefore, such changes and modifications may be made therein as do not affect the spirit of the invention nor exceed the scope thereof as expressed in the appended claims.

What is claimed as new is:

1. A device of the character described, comprising a base, means projecting from and movable on said base for adjustably supporting a reel, means carried by said base and slidably connected to the reel supporting means for limiting the movement of said supporting means and a brake supported on said base and normally in contact with said reel for preventing overrunning thereof.

2. A device of the character described, comprising a base, a U-shaped member pivotally mounted on said base for supporting a reel, means for limiting the movement of said U-shaped member, said means including an arm having one end pivotally connected to the base and the other end slidably connected to one arm of the U-shaped member and brake means carried by said base to prevent the over-running of said reel during rotation thereof.

3. A device of the character described, comprising a base, spaced brackets extending from said base, a U-shaped member pivotally connected to said brackets for adjustably supporting a reel, means carried by said base and slidably connected to the U-shaped member for limiting the movement of said U-shaped member and adjustable brake means supported on said base to prevent the overrunning of the reel during the rotation thereof.

JOHN H. RAM.